Oct. 28, 1969  C. P. PORTERFIELD ET AL  3,475,674
DEVICE FOR CONTROLLING THE AVERAGE OUTPUT POWER OF A SILICON
CONTROLLED RECTIFIER INVERTER FOR INDUCTION HEATING USES
Filed Aug. 29, 1967  2 Sheets-Sheet 1
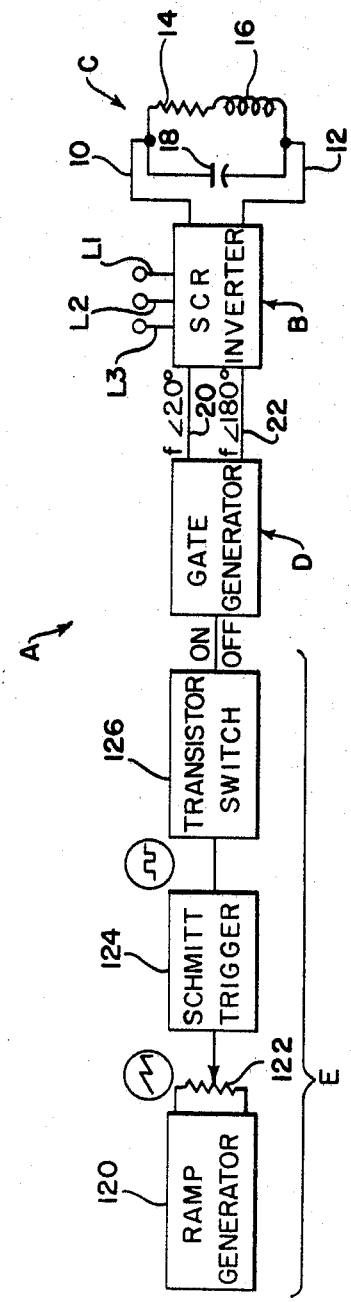
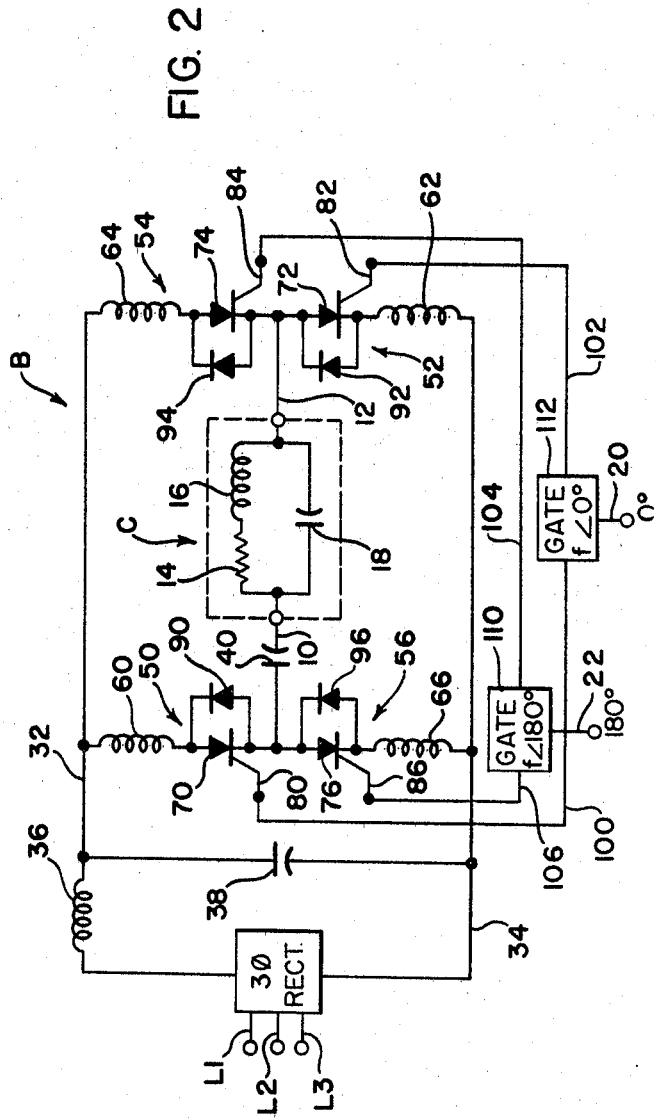
INVENTORS.
CECIL P. PORTERFIELD &
GRAHAM R. ADAMS
BY
Meyer, Tilberry & Body
ATTORNEYS

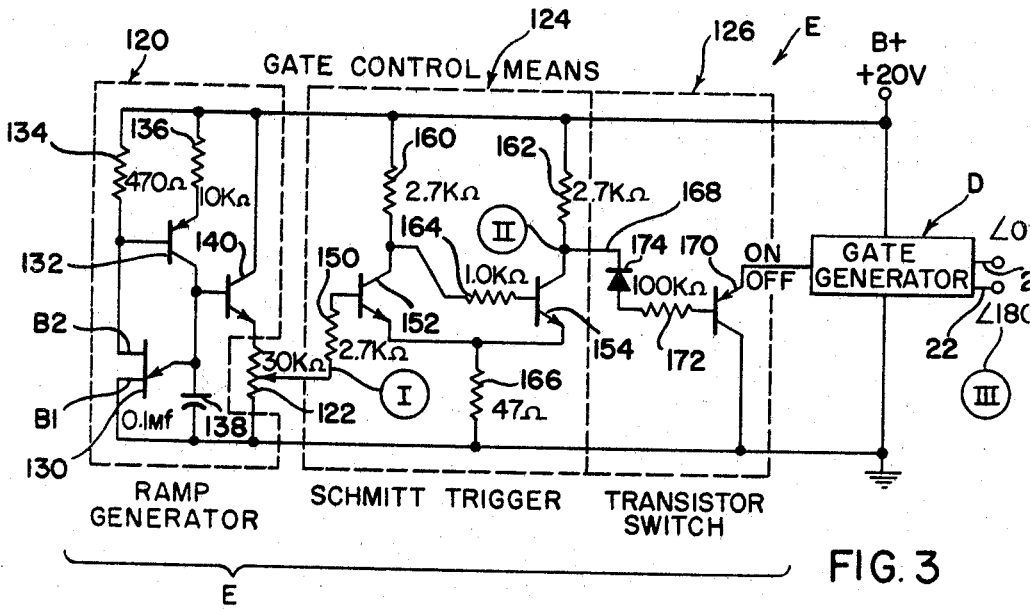
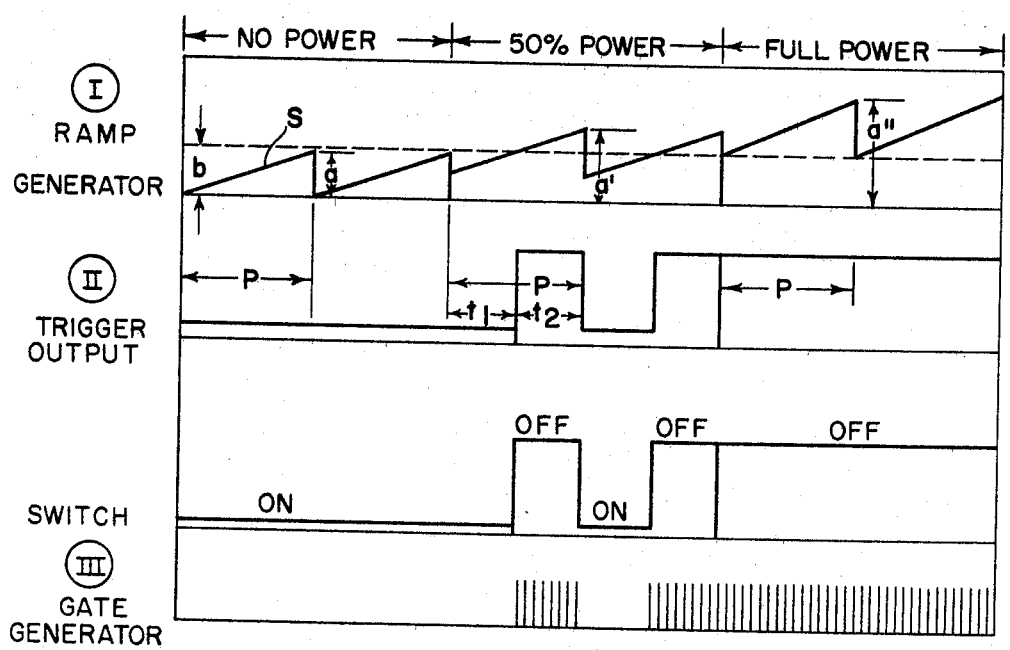
POWER (AVG.) = POWER (MAX) $\frac{t_2}{P}$
= POWER (MAX) $\frac{t_2}{t_1+t_2}$
FIG. 4
INVENTORS.
CECIL P. PORTERFIELD &
GRAHAM R. ADAMS
BY
Meyer, Tilberry & Body
ATTORNEYS

United States Patent Office 3,475,674
Patented Oct. 28, 1969

3,475,674
DEVICE FOR CONTROLLING THE AVERAGE OUTPUT POWER OF A SILICON CONTROLLED RECTIFIER INVERTER FOR INDUCTION HEATING USES
Cecil P. Porterfield, Parma, and Graham R. Adams, Warrensville Heights, Ohio, assignor to Park-Ohio Industries, Inc., Cleveland, Ohio, a corporation of Ohio
Filed Aug. 29, 1967, Ser. No. 664,076
Int. Cl. H02m 7/46
U.S. Cl. 321—45     7 Claims

ABSTRACT OF THE DISCLOSURE

A power control for a silicon controlled rectifier inverter which includes a circuit for turning the inverter "on" and "off" rapidly and for varying the duration "on" to the duration "off" to change the average output power of the inverter.

---

The present invention pertains to the art of power controls for solid state inverters, and more particularly to a device and method for controlling the average output power of a silicon controlled rectifier inverter for induction heating uses.

The invention is particularly applicable for controlling the average output power of a silicon controlled rectifier inverter for use in induction heating, and it will be described with particular reference thereto; however, it should be appreciated that the invention has much broader applications and may be used as a power control for inverters, in general, so long as the load has the capacity for averaging discrete, power bursts.

Induction heating apparatus have been used for many years in various industrial applications. This apparatus generally include an inductor surrounding, or adjacent to, a workpiece and a power supply for passing an alternating current through the inductor to induce circulating heating currents in the workpiece. In the past, motor-generator sets have been used extensively to power the inductor, especially when relatively low frequencies are required. Higher frequencies have necessitated the use of electronic power supplies, usually in the form of an oscillator. Both motor-generator sets and oscillators have been quite successful in induction heating; however, with the advent of various solid state electronic devices, there has been considerable effort devoted to the development of a solid state power supply for introducing an alternating current into the inductor of an induction heating installation. Some of these solid state devices have taken the form of harmonic voltage triplers or multipliers wherein a three phase input is converted into a single phase output having a frequency higher than the input frequency. Also, it has been suggested that an inverter, which converts direct current into an alternating output, could be used for induction heating. The present invention is directed toward an improvement in such an inverter which will adapt it for successful use in induction heating applications.

At this time, the most promising solid state inverter for use in induction heating is the resonant bridge inverter. This inverter generally incorporates a bridge circuit having a central, common branch through which currents are passed in opposite directions by gating separate pairs of silicon controlled rectifiers in spaced switching legs or branches of the bridge. These silicon controlled rectifiers, hereinafter referred to as "SCRS," are gated by a generator which emits a series of repetitive gating pulses. Certain pulses gate one side of the bridge and other pulses gate the other side to provide an alternating current flow through the central branch of the bridge inverter. The output power is taken from the central branch and directed to an appropriate load. To activate the inverter, the gating generator is switched to a condition where it creates the desired gating pulses. This can be done by a switch or by other appropriate switching devices or circuits. Such an arrangement is well adapted for fluorescent lighting, since there is a substantially constant power demand when the lights are "on." For this reason, only a simplified switching arrangement is required to activate the inverter.

Converting such an inverter to induction heating presents serious problems. An inverter generally has an optimum operating frequency. At this frequency, the power demands of various induction heating installation vary drastically. There exists no satisfactory and economical way for adjusting the power output of the inverter to accommodate these variations in the power demand of the induction heating application. Prior power controls for inverters cannot smoothly adjust the output power from no power to full power, as is required in induction heating. In addition, it is not desirable to provide a variable load to inverter coupling for adjusting the output power of the inverter when used for an induction heating operation. Consequently, considerable difficulty has been experienced in converting the series resonant bridge inverter into an acceptable apparatus for powering induction heating applications.

The present invention is directed toward an apparatus and method which overcomes the disadvantages mentioned above and provides a power control for a somewhat standard inverter so that this inverter may be used in induction heating.

In accordance with the present invention, there is provided a device for controlling the average output power of a silicon controlled rectifier inverter. This device includes a gate generator for turning the inverter "on" upon receipt of a first signal and turning the inverter "off" upon receipt of a second signal, means for creating a plurality of alternating first and second signals and means for changing the time spacing between the first and second signals to vary the ratio of inverter time "on" to inverter time "off." In this manner, the average output power of the inverter can be varied in accordance with the ratio of the time during which the inverter is "off" as compared to the time during which the inverter is "on."

The primary object of the present invention is the provision of an economical power control for a silicon controlled rectifier inverter, which power control enables the average output power of the inverter to be varied over a wide range without substantially changing the operating parameters of the inverter.

Another object of the present invention is the provision of a power control for a silicon controlled rectifier inverter, which power control enables the inverter to be used in an induction heating installation requiring various preset levels of output power during the heating or hardening cycle.

Another object of the present invention is the provision of a power control for the silicon controlled rectifier inverter, which power control can be adapted for use with the inverter without substantially modifying the inverter itself.

Yet another object of the present invention is the provision of a power control for a silicon controlled rectifier inverter, which power control is uniform in operation and durable in use.

These and other objects and advantages will become apparent from the following description used to illustrate the preferred embodiment of the invention as read in connection with the accompanying drawings in which:

FIGURE 1 is a block diagram illustrating the preferred embodiment of the present invention;

FIGURE 2 is a wiring diagram illustrating a somewhat conventional silicon controlled rectifier inverter of the type to which the present invention is particularly adapted for use;

FIGURE 3 is a wiring diagram illustrating, in more detail, the preferred embodiment as illustrated in FIGURE 1; and, FIGURE 4 is a graph illustrating certain operating characteristics of the preferred embodiment of the present invention.

Referring now to the drawings wherein the showings are for the purpose of illustrating a preferred embodiment of the invention only and not for the purpose of limitting the same, FIGURE 1 shows a schematic representation of an induction heating installation A including, as the power supply, an SCR resonant bridge inverter B, best shown in FIGURE 2. The inverter includes a three phase input across lines $L_1$, $L_2$ and $L_3$ and output lines 10, 12 across which there is connected an induction heating load C schematically represented as resistor 14, inductor 16 and capacitor 18, connected, as shown. A gate generator D has output lines 20, 22 which direct signals to the inverter which are substantially 180° out of phase for controlling the respective pairs of SCR's in the resonant bridge inverter. In accordance with the present invention, the installation A includes a power control, or gate control means, E for controlling the gate generator D in a manner to be hereinafter described in detail.

Referring now to FIGURE 2, the inverter B includes a D.C. power supply 30 having output lines 32, 34, a filter choke 36 and a filter capacitor 38. In accordance with normal practice, the inverter B includes a common branch having output lines 10, 12 in which there is positioned a commutating capacitor 40. Between the leads 32, 34 there are provided switching legs or branches 50, 52, 54 and 56 which are actuated in pairs, in a manner to be described. The switching legs include inductors or inductances 60, 62, 64 and 66, respectively, which inductors, or inductances, coact with the commutating capacitor 40 to provide a generally sinusoidal wave shape in the various switching legs and through the common branch of the inverter. Silicon controlled rectifiers, or SCR's, 70, 72, 74 and 76 are provided in the switching legs, and these SCR's are gated "on," or made conductive, by signals received through gates 80, 82, 84 and 86, respectively, when the SCR's are forward biased. To provide for reverse current flow around the SCR's, in accordance with normal practice, there are incorporated reversely oriented diodes 90, 92, 94 and 96. The gates are controlled by lines 100, 102, 104 and 106 connected with gating units, or switches 110, 112. Signals from lines 20, and 22 alternately gate either branches 50 and 52 or branches 54 and 56 so that current flow through the common branch of the inverter is caused alternately by different sets of SCR's.

When an SCR set is gated "on," or conductive, current flow is caused between lines 34 and 32 through the legs or branches containing the conducting SCR's. The interaction of capacitor 40 and the inductances within the switching legs first causes a current flow in a forward direction through the conducting SCR's. Thereafter, the resonant circuit created by the capacitor and inductances tends to cause a reverse flow through the conducting SCR's. Since this cannot take place, the current flows through the shunting diodes. This applies a reverse bias to the conducting SCR's so that they are turned "off" until a subsequent gating signal is received during a period of forward bias. The resonant current flow through the common branch is effected by alternately switching selected pairs of SCR's. This causes a generally sinusoidal current flow through the induction heating load C, which current flow is basically the vectorial summation of the current flow caused by the gating of alternate pairs of SCR's. This general operation of the inverter B is well known in the electrical field and further description thereof is not necessary.

Referring again to FIGURE 1, the gate control means or power control, constructed in accordance with the preferred embodiment of the present invention, includes a linear ramp generator 120 which produces a sawtooth output pulse or signal. The level of this output pulse or signal is controlled by a potentiometer 122 which is directly connected with a threshold actuated or threshold detector device, such as a Schmitt trigger, so that the trigger is actuated when the sawtooth pulse from the generator 120 exceeds the threshold value of the trigger. The threshold actuated device 124 controls a switching device 126 which, in turn, alternately turns the gate generator D "on" and "off." The time "on" and "off" is determined by the spacing of the output pulses of the threshold actuated device. This is in turn controlled by the sawtooth signal or output of generator 120 and its adjusted level which is controlled by the potentiometer 122. This is only a general description of the operation of the preferred embodiment of the present invention. A more detailed understanding of this operation will be realized after a description of the various constituent components.

Referring now to FIGURE 3, the linear ramp generator 120 incluudes a unijunction transistor 130 having bases $B_1$ and $B_2$. This unijunction transistor is a 2N2646 Motorola transistor. A constant current supply is formed by a 2N3905 Motorola transistor 132 having a base resistor 134 and an emitter resistor 136. This constant current supply charges a capacitor 138 in a linear fashion determined by the leakage across the bases of transistor 130. Thus, a sawttoth signal is created at point I, which signal is illustrated at the top of the graph in FIGURE 4. The sawtooth pulse S is shown in FIGURE 4 as having a maximum height $a$. The sawtooth pulse is adjusted upwardly by appropriate adjustment of the potentiometer 122. At the left, the potentiometer is at its lowermost point, and the sawtooth is positioned in a manner to provide a minimum output power for the inverter B. In the central portion of the curve in FIGURE 4, the sawtooth pulse S is shown with the potentiometer 122 adjusted for approximately 50% power. On the right, the potentiometer has been adjusted for maximum power. The effect of this adjustment will be explained later.

It is appreciated that for a given power setting for the inverter, the potentiometer remains at the same position, and a series of alternate sawtooth pulses S are provided. At 50% power, the maximum height of the sawtooth pulses is $a'$. In a like manner, at maximum output power for the inverter, the height of the sawtooth pulses is $a''$. The pulses have a period P which is, in accordance with the preferred embodiment of the invention, less than 0.01 second. In other words, the output frequency of the ramp generator is less than approximately 100. In practice, the output frequency of the ramp generator is approximately 80 cycles per second. The intended output frequency of the inverter is approximately 3,000 cycles per second; therefore, the period of the inverter is substantially less than the period P of the sawtooth or ramp generator 120. In other words, a substantial number of gating pulses takes place during the time of a single sawtooth pulse S. This feature will be explained later.

Referring now to the threshold actuated or threshold detector device 124, this device has a threshold level $b$ shown in the upper graph of FIGURE 4. When the input to the device 124 exceeds this level, the device is shifted from its normal operating output. This shifting back and forth of the output of the threshold actuated device 124 is utilized to trigger the pulse generator, for a given portion of the sawtooth pulse S, to control the time duration of period P when the inverter is gated "on." In accordance with the preferred embodiment of the present invention the device 124 is a Schmitt trigger, which is a somewhat standard threshold detecting or actuated device. This trigger includes an input resistor 150, normally non-conducting transistor 152, normally conducting transistor 154, power resistors 160, 162, transistor coupling resistor 164, low resistance resistor or regenerating resistor 166, and an output lead 168. The transistors 152 and 154 are Motorola transistors 2N3903. In operation, the transistor 154 is normally conducting. Consequently, point II at lead 168 is close to ground potential. This is shown in the second graph of FIGURE 4. When the voltage of point I reaches the threshold level $b$ of trigger 124, transistor 152 is rendered conductive. This immediately reverse biases transistor 154. Consequently, the point II approaches the B+ voltage of approximately 20 volts.

Referring now to the second graph in FIGURE 4 which is the point II, during no load conditions, the sawtooth pulse S does not reach the threshold level $b$ of the trigger 124. Consequently, the point II remains relatively close to ground potential. When the potentiometer 122 is adjusted for approximately 50% power, the sawtooth pulse S reaches the threshold level $b$ at approximately the mid-point of period P. Until this occurs, the point II remains close to ground potential. The portion of period P until the pulse S reaches the level $b$ is designated $T_1$. Thereafter, the point II is relatively close to the 20 volt positive voltage of the total control circuit. This portion of the period P is designated $T_2$. The ratio of $T_1$ to $T_2$ determines the ratio of time that the inverter B is "off," as compared to the time that the inverter B is "on." This function will be better appreciated after a description of the switching device 126.

Referring now to the switching device 126, a transistor 170 forms the major portion of the device. This transistor is a 2N3905 Motorola transistor which includes a base current limiting resistor 172 and a diode 174. The diode is a 1N4002 Motorola diode. The emitter voltage of transistor 170 is between the extreme positions of point II. Consequently, when point II is at approximately ground potential, the transistor 170 is forward biased and conductive. When the point II is approximately at the B+ level of the power control circuit, the transistor 170 is reversed biased and is turned "off." By internal circuitry, the gate generator is turned "off" when the transistor 170 is conducting, and vice versa. For this reason, gating signals represented by the lower curve in FIGURE 4 and at point III are emitted from the gate generator D only when the transistor 170 is turned "off." This transistor is turned "off" when the sawtooth pulse 60 exceeds the threshold level $b$ of trigger 124.

As is clearly appreciated by the above description, the power of the inverter B is controlled by adjusting the level of the repetitive pulses S created by ramp generator 120. In this manner, the power can be adjusted from a maximum to a minimum level. Indeed, the inverter may be completely turned "off" or turned "on" in accordance with the setting of potentiometer 122. This provides an efficient and highly satisfactory means for adjusting the output power of the inverter B. By providing the period P with a length substantially greater than the period of time between successive gating pulses, each cycle of the pulse generator 120 can be utilized for controlling the inverter B over wide ranges. For this reason, the frequency of the generator 120 is relatively low when compared with the output frequency of the inverter itself.

This type of power adjustment has proven satisfactory for induction heating since an induction heating load has a relatively long thermal time constant. The load, therefore, does not see the successive "on" and "off" portions of the inverter. To the contrary, the load sees only the average power which is supplied to the load by the inverter as it is being repetitively switched "on" and "off" by the gate control or power control device E. It has also been found that meters used for audio frequency induction heating equipment accurately records the output power of the inverter since they have mechanical time constants or other internal arrangements which can average the power being imposed upon the load by the inverter.

To more fully describe the preferred embodiment of the invention, the values of the various components making up the gate control means E are listed on the wiring diagram of FIGURE 3. With these values, and knowing the particular type of transistors used, a complete understanding of the operation of the preferred embodiment of the present invention, when taken with the above description, is readily apparent to any person skilled in the art of induction heating.

A modification could be made to the illustrated preferred embodiment of the present invention wherein the gate control means will produce a train of rapidly repeating pulses having a selected time duration. These pulses will either energize or deenergize the gate generator D and, thus, the inverter B. By changing the spacing between the pulses, the ratio of time "on" to time "off" will be varied to change the average output power of the inverter. If the pulses energize the inverter, a reduced spacing will increase the time "on" of the inverter and, thus, the output power. In a like manner, if the pulses deenergize the generator, a reduced spacing will increase the time "off" of the inverter and, thus, reduce the average output power. This latter embodiment would require shorter pulses so that full power would be obtained by wide spacing of the pulses. Indeed, the spacing may be infinite for full power. A person skilled in the inverter art could develop circuits or mechanical devices for these modifications.

Having thus described our invention, we claim:

1. In an induction heating installation for powering an induction heating load, said installation comprising a silicon controlled rectifier inverter having an alternating current output, said inverter being turned on upon receipt of a repetitive gating signal and turned off on the absence of such a gating signal, a gate generator means for subjecting said inverter to a gating signal when energized, and gate control means for selectively energizing said gate generator means, the improvement comprising: said gate control means comprising a circuit for generating repetitive pulses each having a period P and a wave shape dividing each of said pulses into a first portion $t_1$ that deenergizes said gate generator and a second portion $t_2$ that energizes said gate generator, with $t_1+t_2$ generally equal to P, and circuit means for changing the ratio of $t_1$ to $t_2$ to alter the average power of said inverter, said gate control means including a two condition switch means responsive to said pulses for deenergizing said gate generator when in a first condition and for energizing said gate generator when in a second condition.

2. The improvement as defined in claim 1 wherein said two condition switch means includes a transistor which has a conducting condition when said switch means is in one of said first and second conditions and a non-conducting condition when said switch means is in the other of said first and second conditions.

3. The improvement as defined in claim 2 wherein said transistor includes a base lead and a diode means in said base lead for conducting current only when said transistor is in the conductive condition.

4. In an induction heating installation for powering an induction heating load, said installation comprising a silicon controlled rectifier inverter having an alternating current output, said inverter being turned on upon receipt of a repetitive gating signal and turned off on the absence of such a gating signal, a gate generator means for subjecting said inverter to a gating signal when energized, and gate control means for selectively energizing said gate generator means, the improvement comprising: said gate control means comprising a circuit for generating repetitive pulses each having a period P and a wave shape dividing each of said pulses into a first portion $t_1$ that deenergizes said gate generator and a second portion $t_2$ that energizes said gate generator, with $t_1+t_2$ generally equal to P, and circuit means for changing the ratio of $t_1$ to $t_2$ to alter the average power of said inverter, said generating circuit including a ramp generator having a sawtooth output with a period P and a maximum height $a$, a trigger circuit having a first output when the input is below a value $b$ and a second output when the input is above $b$, said output of said trigger circuit forming said repetitive pulses, said sawtooth output being applied to the input of said trigger means, and said circuit means for changing the ratio of $t_1$ to $t_2$ including means for increasing the maximum height $a$ of said sawtooth output to a selected value above $b$.

5. The improvement as defined in claim 4 wherein said ramp generator is a linear ramp generator.

6. The improvement as defined in claim 4 wherein said means for increasing the maximum height $a$ is a potentiometer.

7. The improvement as defined in claim 4 wherein said trigger circuit is a Schmitt trigger.

References Cited
UNITED STATES PATENTS

| 3,325,716 | 6/1967 | Gomi | 321—45 XR |
| 3,360,712 | 12/1967 | Morgan | 321—43 |

JOHN F. COUCH, Primary Examiner

W. M. SHOOP, Jr., Assistant Examiner

U.S. Cl. X.R.

219—10.75